US010158316B2

(12) United States Patent
Sawamura et al.

(10) Patent No.: US 10,158,316 B2
(45) Date of Patent: Dec. 18, 2018

(54) MOTOR CONTROL APPARATUS, POWER CONVERSION DEVICE, AUXILIARY POWER SOURCE DEVICE, AND METHOD FOR CONTROLLING AUXILIARY POWER SOURCE DEVICE

(71) Applicant: KABUSHIKI KAISHA YASKAWA DENKI, Kitakyushu-shi (JP)

(72) Inventors: Mitsujiro Sawamura, Kitakyushu (JP); Yasuhiko Kaku, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/429,170

(22) Filed: Feb. 10, 2017

(65) Prior Publication Data
US 2017/0229994 A1    Aug. 10, 2017

(30) Foreign Application Priority Data

Feb. 10, 2016    (JP) .................. 2016-024063

(51) Int. Cl.
*H02P 27/08*    (2006.01)
*H02M 7/06*    (2006.01)
(Continued)

(52) U.S. Cl.
CPC ............ *H02P 27/08* (2013.01); *H02M 5/458* (2013.01); *H02M 7/06* (2013.01); *H02M 7/537* (2013.01);
(Continued)

(58) Field of Classification Search
CPC .................. H02P 27/08; H02P 6/14
(Continued)

(56) References Cited

U.S. PATENT DOCUMENTS 6,732,838 B1    5/2004    Okada et al.
6,930,460 B2 *    8/2005    Ishikawa ............... B60L 3/0046
                                                    318/108
(Continued)

FOREIGN PATENT DOCUMENTS

CN    1353081    6/2002
CN    1425214    6/2003
(Continued)

OTHER PUBLICATIONS

Japanese Office Action for corresponding JP Application No. 2016-024063, dated Jan. 11, 2018 (w/ machine translation).
(Continued)

*Primary Examiner* — David S Luo
(74) *Attorney, Agent, or Firm* — Mori & Ward, LLP

(57) ABSTRACT

A motor control apparatus includes an AC-DC converter, an auxiliary power source, and an inverter. The AC-DC converter converts AC power into DC power and feeds the DC power to a DC bus bar. DC power is fed from the auxiliary power source to the DC bus bar and from the DC bus bar to the auxiliary power source. The inverter converts the DC power of the DC bus bar into the AC power and feeds the AC power to a motor. The auxiliary power source includes a capacitor, a DC-DC converter, and circuitry. The DC-DC converter performs conversion between a first DC voltage of the DC bus bar and a second DC voltage applied between both terminals of the capacitor or inside of the capacitor. The circuitry is configured to control the DC-DC converter to maintain positive correlation between the second DC voltage and the first DC voltage.

14 Claims, 7 Drawing Sheets

(51) Int. Cl.
*H02M 7/537* (2006.01)
*H02P 6/14* (2016.01)
*H02M 5/458* (2006.01)
*H02M 3/158* (2006.01)

(52) U.S. Cl.
CPC ............... *H02P 6/14* (2013.01); *H02M 3/158* (2013.01); *H02P 2201/03* (2013.01)

(58) Field of Classification Search
USPC .................................................. 318/440, 34
See application file for complete search history.

(56) References Cited

U.S. PATENT DOCUMENTS

| | | | |
|---|---|---|---|
| 7,099,756 B2 * | 8/2006 | Sato | B60W 10/08 180/65.245 |
| 7,982,426 B2 * | 7/2011 | Itoh | H02M 7/5387 318/108 |
| 2002/0053490 A1 | 5/2002 | Banno et al. | |
| 2007/0241719 A1 | 10/2007 | Itoh et al. | |
| 2009/0237016 A1 | 9/2009 | Iwashita et al. | |

FOREIGN PATENT DOCUMENTS

| | | |
|---|---|---|
| CN | 102332740 | 1/2012 |
| JP | 08-242576 | 9/1996 |
| JP | 10-164862 | 6/1998 |
| JP | 2007-097258 | 4/2007 |
| JP | 2008-289326 | 11/2008 |
| JP | 4512145 B2 | 10/2009 |
| JP | 2011-223782 | 11/2011 |

OTHER PUBLICATIONS

Chinese Office Action for corresponding CN Application No. 201710070146.7, dated Oct. 12, 2018.

* cited by examiner

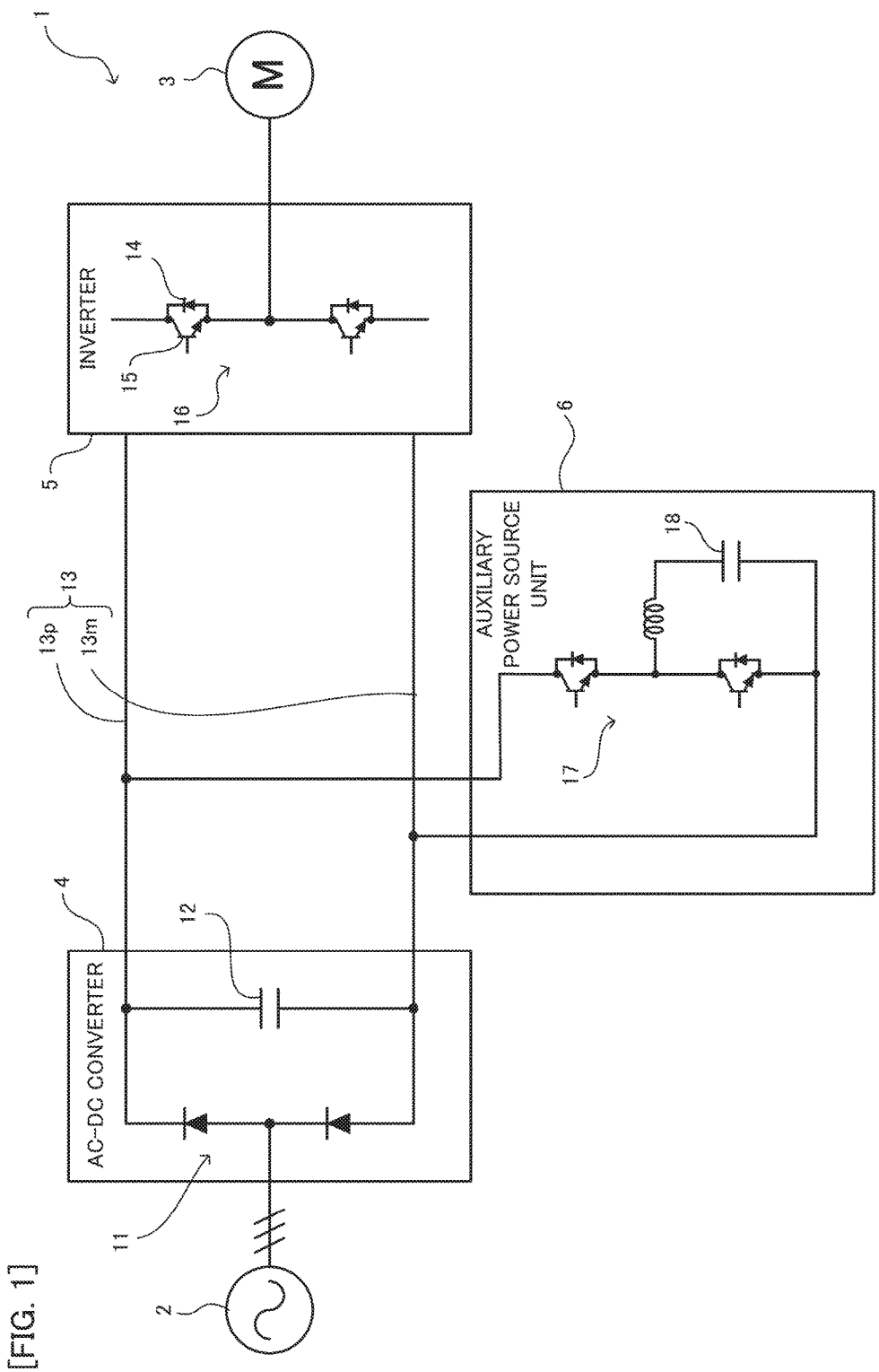
[FIG. 1]

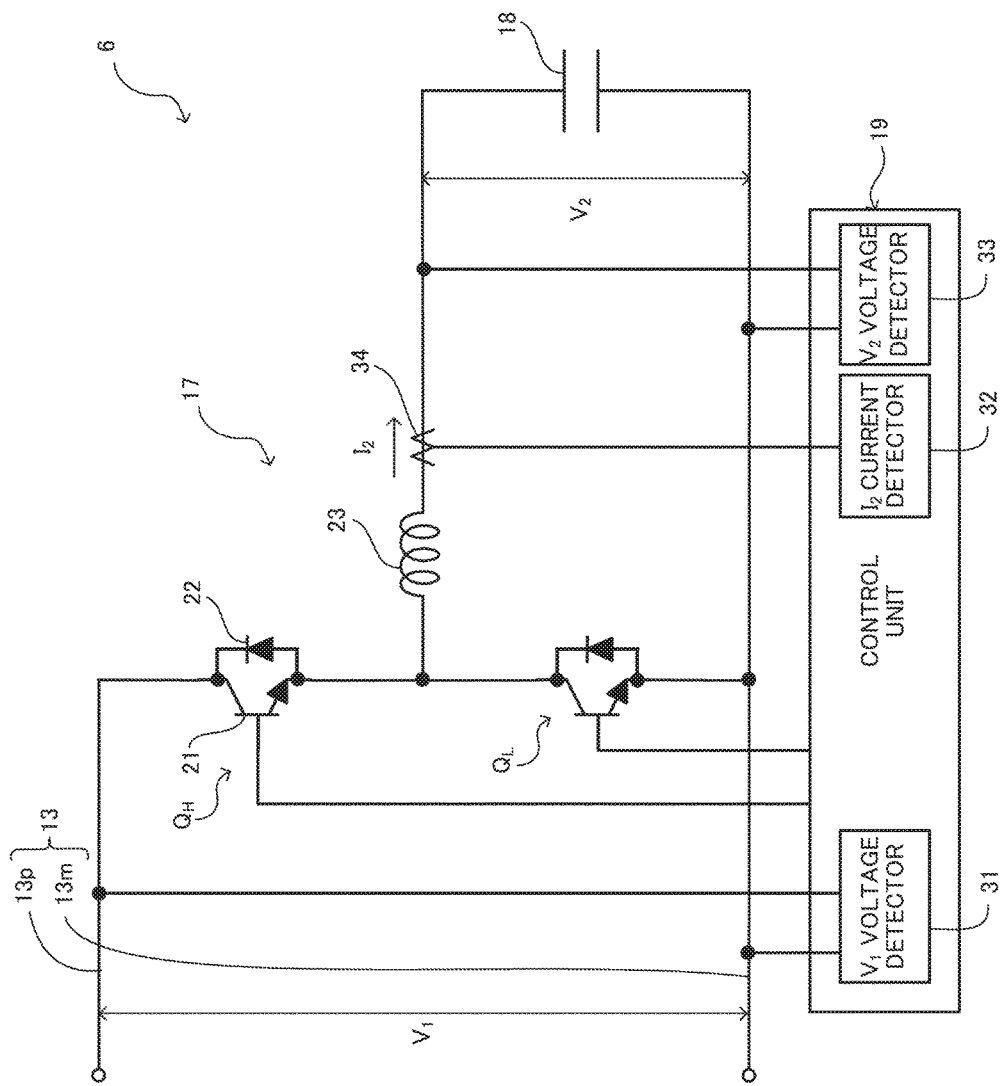
[FIG. 2]

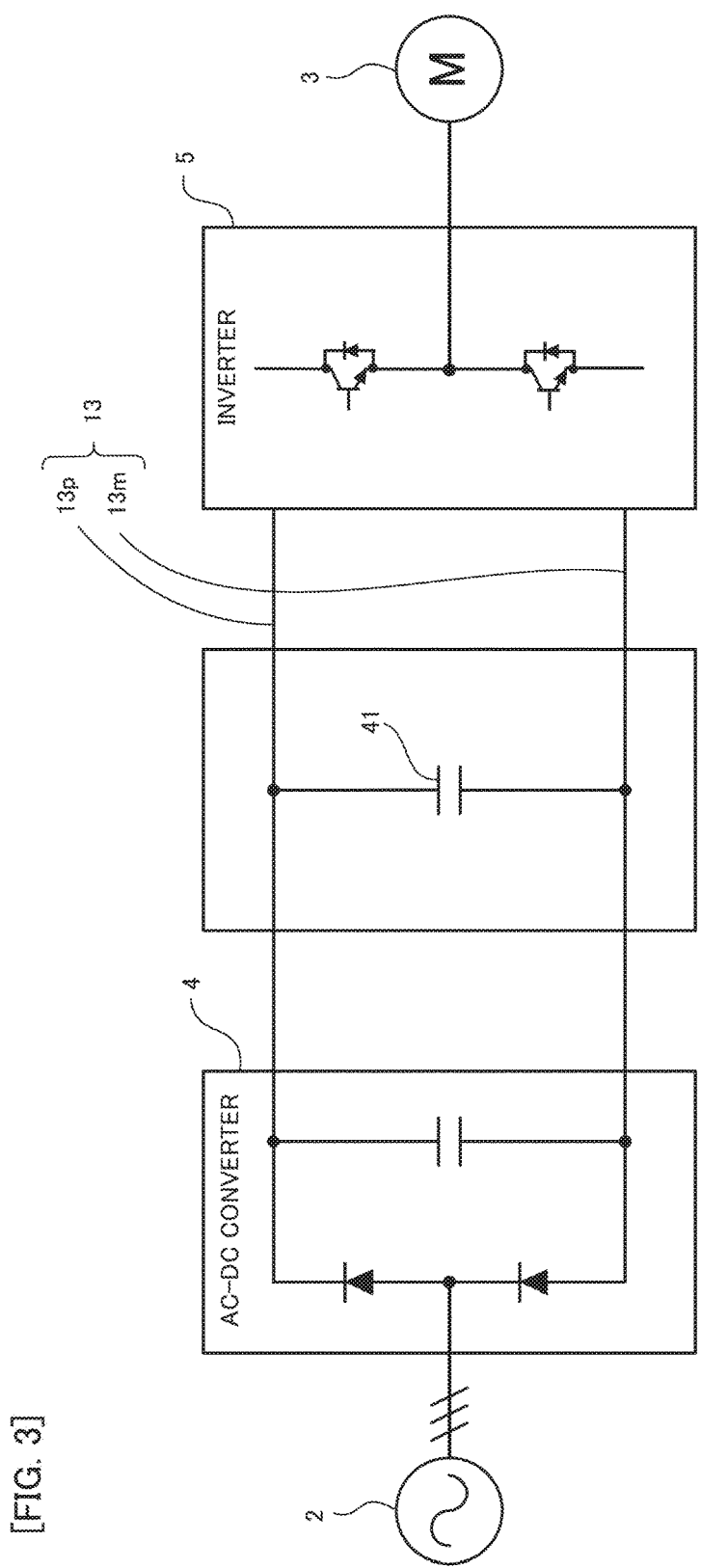
[FIG. 3]

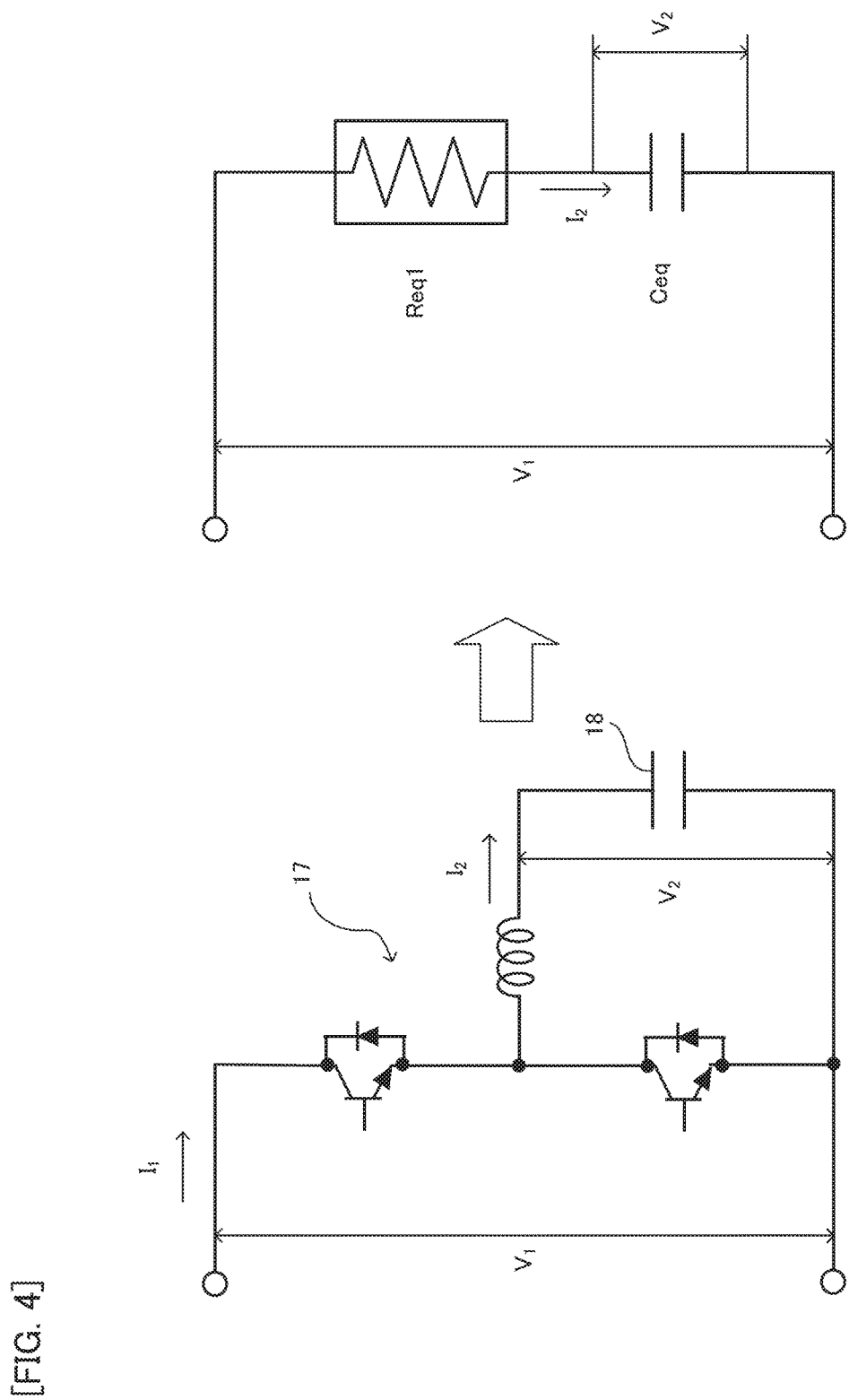
[FIG. 4]

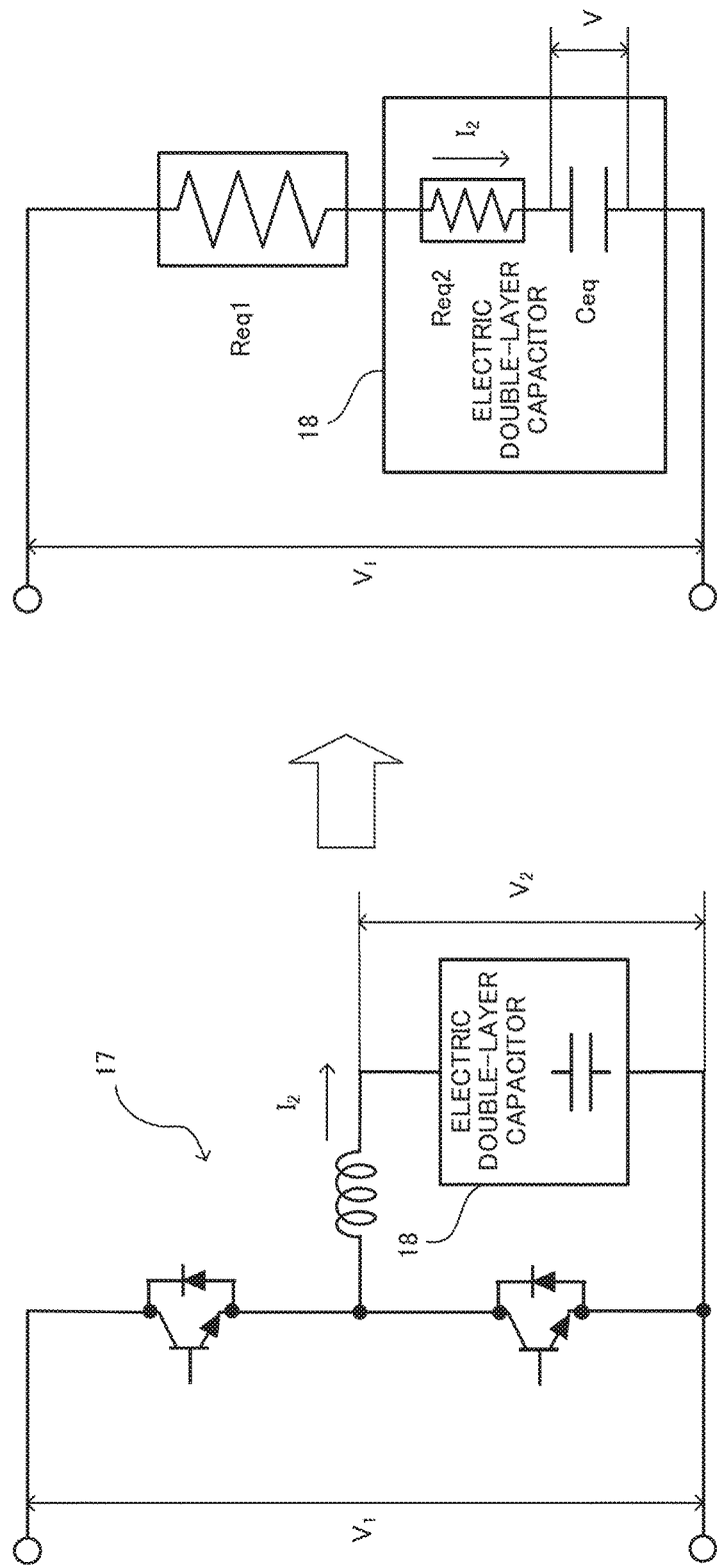
[FIG. 5]

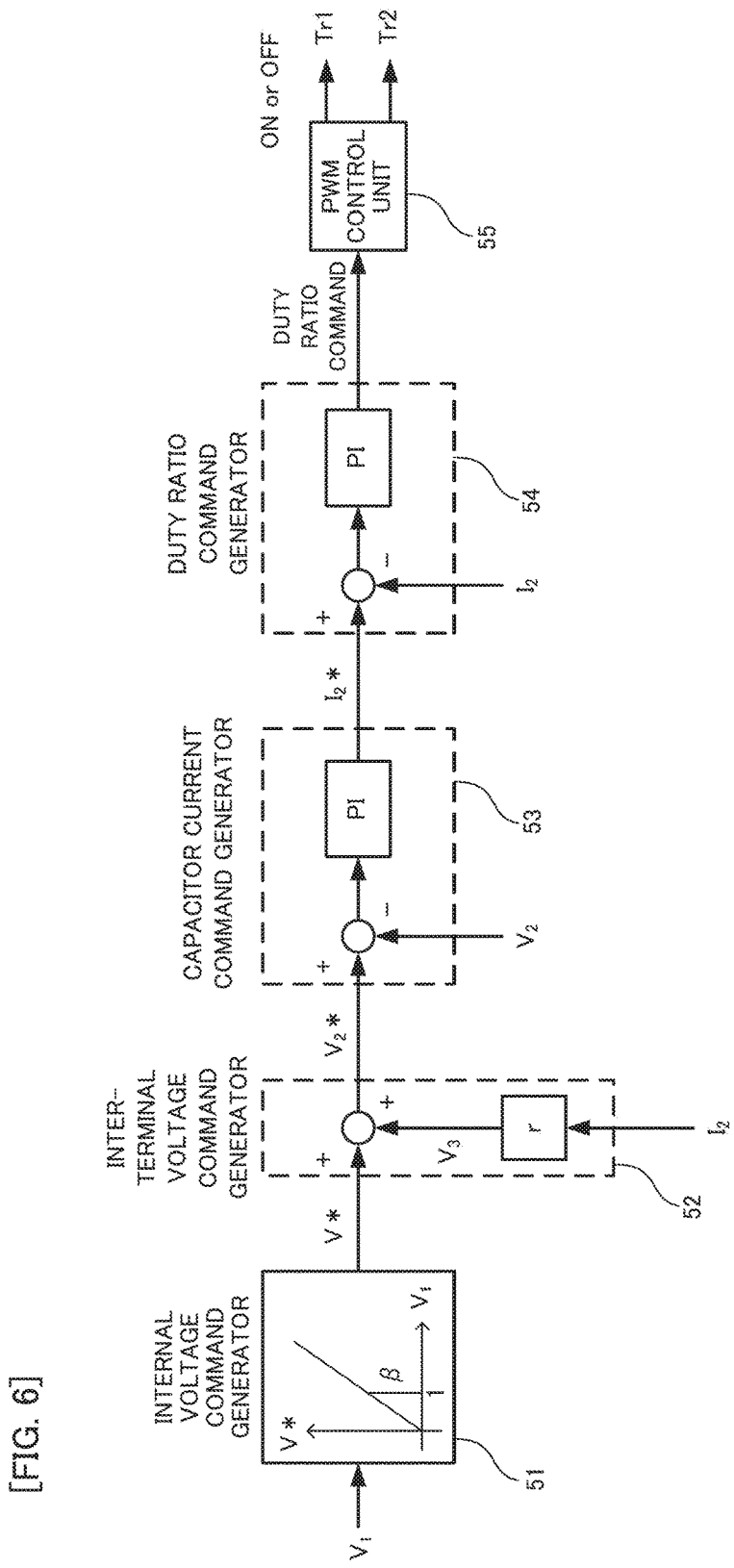
[FIG. 6]

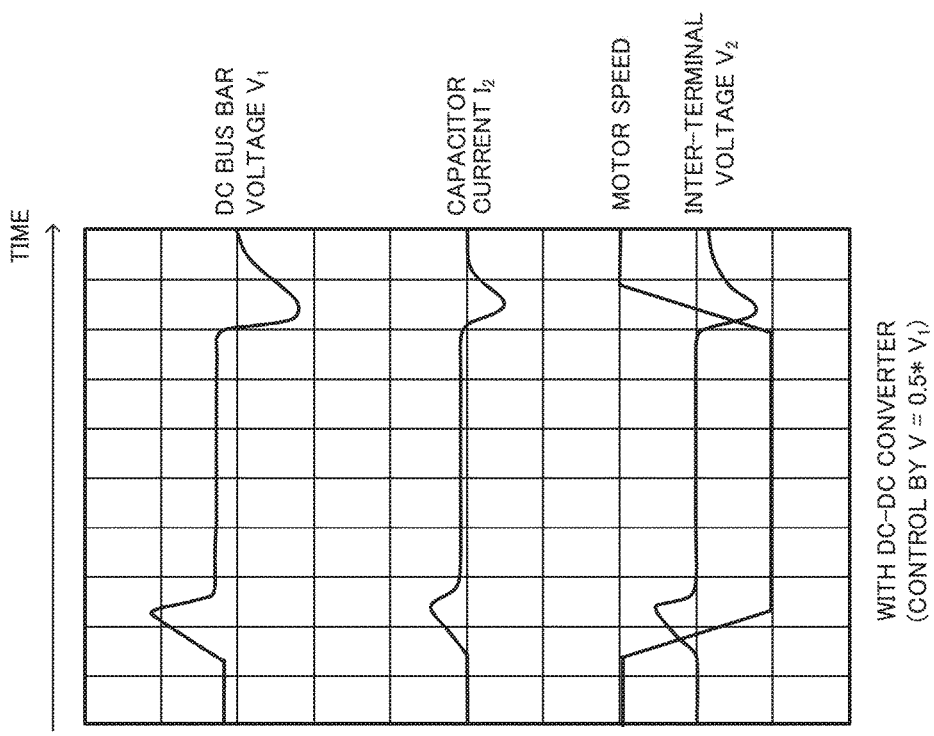
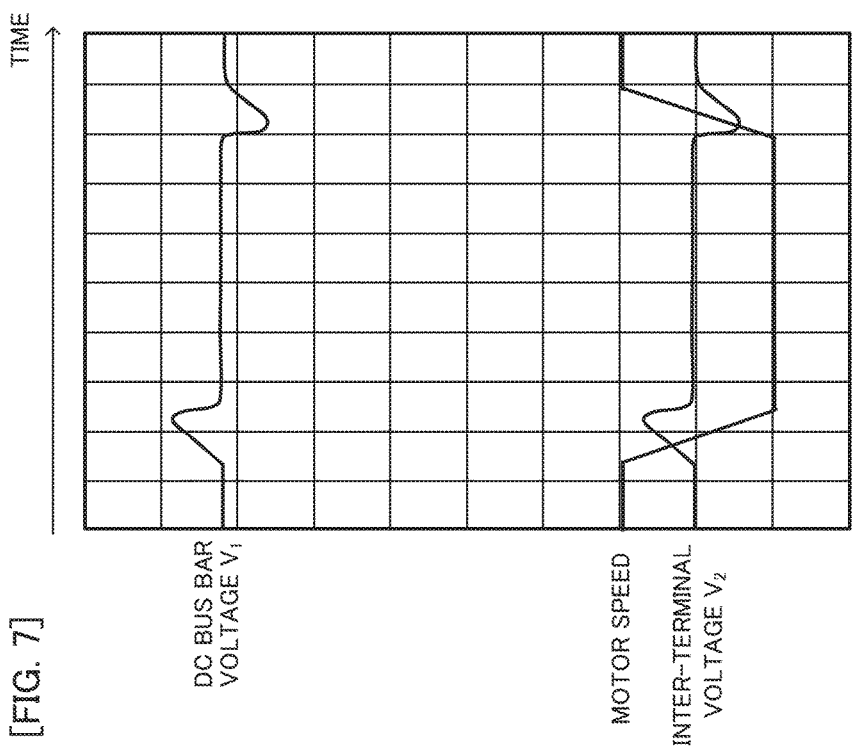
[FIG. 7]

MOTOR CONTROL APPARATUS, POWER CONVERSION DEVICE, AUXILIARY POWER SOURCE DEVICE, AND METHOD FOR CONTROLLING AUXILIARY POWER SOURCE DEVICE

CROSS-REFERENCE TO RELATED APPLICATION

The present application is based upon and claims the benefit of priority to Japanese Patent Application No. 2016-024063, filed Feb. 10, 2016. The entire contents of this application are incorporated herein by reference.

BACKGROUND

Technical Field

The disclosed embodiment relates to a motor control apparatus, a power conversion device, an auxiliary power source device, and a method for controlling the auxiliary power source device.

Description of Background Art

There is known a motor control apparatus that controls charging and discharging of a capacitor by switching between a step-up operation and a step-down operation of a DC-DC converter.

SUMMARY

According to one aspect of the present disclosure, a motor control apparatus includes an AC-DC converter, an auxiliary power source, and an inverter. The AC-DC converter converts AC power into DC power and feeds the DC power to a DC bus bar. DC power is fed from the auxiliary power source to the DC bus bar and from the DC bus bar to the auxiliary power source. The inverter converts the DC power of the DC bus bar into the AC power and feeds the AC power to a motor. The auxiliary power source includes a capacitor, a DC-DC converter, and circuitry. The DC-DC converter performs conversion between a first DC voltage of the DC bus bar and a second DC voltage applied between both terminals of the capacitor or inside of the capacitor. The circuitry is configured to control the DC-DC converter to maintain positive correlation between the second DC voltage and the first DC voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a diagram showing an exemplary schematic circuit configuration of a motor control apparatus of a first embodiment;

FIG. 2 is a diagram showing an exemplary specific configuration of an auxiliary power source unit;

FIG. 3 is a diagram showing an exemplary comparative configuration in which capacitors for charging and discharging are directly connected between DC bus bars;

FIG. 4 is a diagram illustrating equivalence between the entire auxiliary power source unit and a series circuit of an equivalent resistor and a capacitor in the first embodiment;

FIG. 5 is a diagram illustrating equivalence between the entire auxiliary power source unit and a series circuit of an equivalent resistor, an equivalent internal resistor and a capacitor in a second embodiment;

FIG. 6 is a diagram showing an exemplary feedback control block to realize PWM control in the second embodiment;

FIG. 7 is a diagram showing a result of a charging and discharging test using the feedback control block in the second embodiment.

DETAILED DESCRIPTION OF THE EMBODIMENTS

1: First Embodiment

Hereinbelow, a description will be given of a first embodiment with reference to the drawings.

<1-1: Schematic Configuration of Motor Control Apparatus>

FIG. 1 is a diagram showing an exemplary schematic circuit configuration of a motor control apparatus of the present embodiment. The motor control apparatus 1 converts AC power fed from an external AC power source 2 into DC power, and then converts the DC power into predetermined AC power by PWM control and feeds the AC power to a motor 3, thereby performing drive control of the motor 3. In FIG. 1, the motor control apparatus 1 includes an AC-DC converter 4, an inverter 5, and an auxiliary power source unit 6.

The AC-DC converter 4 (an embodiment of AC-DC converter unit) includes, for example, a rectification unit 11 composed of a diode bridge; and a smoothing capacitor 12. The AC-DC converter 4 rectifies AC power from the external AC power source with the rectification unit 11 and smoothes the AC power with the smoothing capacitor 12 to feed DC power to a DC bus bar 13.

The inverter 5 (an embodiment of inverter unit) includes a switching circuit 16 configured by bridge-connecting semiconductor switching elements 15 in which, for example, flywheel diodes 14 are connected in parallel. The inverter 5 switches respective semiconductor switching elements 15 in a proper timing through PWM control of a drive controller (not particularly shown). The inverter 5 converts the DC power of the DC bus bar 13 into an AC voltage of a desired frequency and waveform and feeds the AC power to the motor 3 to perform its drive control.

The auxiliary power source unit 6 includes a DC-DC converter 17 and a capacitor 18 (details will be described later), and is connected between the DC bus bars. The auxiliary power source unit 6 performs charging and discharging to and from the capacitor 18 so as to suppress fluctuations of the DC voltage through active control.

For instance, in the case that the motor 3 to be controlled has large volume, the motor control apparatus 1 as configured above performs the drive control to perform its rapid acceleration and deceleration, thereby the DC voltage between the DC bus bars 13 fluctuates largely to cause excess and deficiency of DC power, and thus its control easily becomes unstable. The auxiliary power source unit 6 selectively performs a power peak cut operation and a power assist operation depending on these changes in DC voltage. That is, in the case that the DC voltage of the DC bus bars 13 rises, the auxiliary power source unit 6 performs the power peak cut to charge the capacitor 18 with the excess DC power. Moreover, in the case that the DC voltage of the DC bus bar 13 lowers, the auxiliary power source unit 6 performs the power assist to discharge (regenerate) its deficient DC power from the capacitor 18.

In the present embodiment, as the capacitor 18 included in the auxiliary power source unit 6, an electric double-layer capacitor is employed. Hereinbelow, the capacitor 18 is also referred to as an electric double-layer capacitor 18. The electric double-layer capacitor 18, having a lower internal resistance than a secondary battery using chemical reactions, can be charged and discharged with a large current in a short time. On the other hand, in order to prevent overcharge and over discharge, it is preferable to control charging and discharging with the DC-DC converter 17 while monitoring its state.

<1-2: Example of Specific Configuration of Auxiliary Power Source Unit>

FIG. 2 is a diagram showing an exemplary specific configuration of the auxiliary power source unit 6. In FIG. 2, the auxiliary power source unit 6 includes the DC-DC converter 17, the electric double-layer capacitor 18, and a control unit 19.

In the example of the illustrated present embodiment, the DC-DC converter 17 (an embodiment of DC-DC converter unit) is a two-way flow type chopper circuit (switching regulator) including a semiconductor switching element 21, a diode 22, and an inductance element 23. The diode 22 (parasitic diode in the case of the MOSFET) is connected in parallel between a collector and emitter (source and drain) of the semiconductor switching element composed of, for example, an IGBT or MOSFET to constitute an arm switching element. The two arm switching elements are serially connected between a positive side wiring 13p and a negative side wiring 13m of the DC bus bars 13. Note that the diodes 22 of the respective arm switching elements are, similarly to the so-called flywheel diode, connected with a direction from the negative side wiring 13m toward the positive side wiring 13p as a forward direction, respectively. Moreover, in the present embodiment, the arm switching element connected to the positive side wiring is referred as an upper arm switching element $Q_H$, and the other one connected to the negative side wiring is referred as a lower arm switching element $Q_L$. Further, one end of an inductance element 23 (the left side end thereof in the drawing) is connected to an intermediate point between the two arm switching elements $Q_H$ and $Q_L$. The inductance element 23 (an embodiment of inductor) is specifically a coil (reactor, choke coil) and performs accumulation and release of electromagnetic energy accompanied with switching of the respective arm switching elements $Q_H$ and $Q_L$.

The electric double-layer capacitor 18 is connected between the other end of the inductance element 23 (the right side end thereof in the drawing) and the negative side wiring 13m of the DC bus bar 13.

The control unit 19 includes a DC bus bar voltage detector 31 (abbreviated to "$V_1$ voltage detector" in the drawing), a capacitor current detector 32 (abbreviated to "$I_2$ current detector" in the drawing), and an inter-terminal voltage detector 33 (abbreviated to "$V_2$ voltage detector" in the drawing). The DC bus bar voltage detector 31 (an embodiment of first voltage detector) detects a DC bus bar voltage $V_1$ between the positive side wiring 13p and the negative side wiring 13m of the DC bus bar 13. The capacitor current detector 32 (an embodiment of current detector) detects a capacitor current $I_2$ flowing through the electric double-layer capacitor 18 using a current sensor 34 such as a hall element, for example. The inter-terminal voltage detector 33 detects the voltage $V_2$ between both terminals of the electric double-layer capacitor 18. Further, the control unit 19 controls switching of the respective arm switching elements $Q_H$ and $Q_L$ through PWM control based on the detection values of the respective detectors 31, 32, and 33.

In the auxiliary power source unit 6 as configured above, the DC-DC converter 17 performs charging and discharging of the electric double-layer capacitor 18 by using the accumulation and release operation of electromagnetic energy in the inductance element 23 accompanied with the switching of the respective arm switching elements $Q_H$ and $Q_L$, and current directivity of each diode 22. In particular, the DC-DC converter 17, as configured as shown in the drawing, functions as a two-way flow type to perform conversion of DC power in a bidirectional manner of both step-up and step-down, that is, both charging and discharging of the electric double-layer capacitor 18 on an assumption that the voltage $V_2$ between both terminals is constantly maintained lower than the DC bus bar voltage $V_1$. This switching of charging and discharging is carried out in accordance with the duty ratio of the PWM control through which the control unit 19 performs the switching of the respective arm switching elements $Q_H$ and $Q_L$.

In the PWM control of the control unit 19, the two arm switching elements $Q_H$ and $Q_L$ are not simultaneously in an ON state. Except for a short dead time period (the period during which both arm switching elements are in an OFF state) provided to protect the respective arm switching elements $Q_H$ and $Q_L$, mostly either one of the two arm switching elements $Q_H$ and $Q_L$ is in the ON state, and the other is in the OFF state. The upper arm switching element $Q_H$ and the lower arm switching element $Q_L$ are switch-controlled to be a combination of ON/OFF or a combination of OFF/ON.

Further, in a fixed cycle, the ratio between a period of time during which the upper arm switching element $Q_H$ is in the ON state, and a period of time during which the lower arm switching element $Q_L$ is in the ON state, is the duty ratio. The charging and discharging (regeneration) between the DC bus bar 13 and the electric double-layer capacitor 18 is switched in accordance with this duty ratio. In the case of the illustrated chopper circuit, under the condition of $V_2=V_1/2$, specifically at the duty ratio with a higher ratio of a period of time during which the upper arm switching element $Q_H$ is in the ON state, the electric double-layer capacitor 18 is charged (power peak cut). At the duty ratio with a higher ratio of a period of time during which the lower arm switching element $Q_L$ is in the ON state, the electric double-layer capacitor 18 is discharged (power assist). Furthermore, its charging and discharging amount is controlled in accordance with the magnitude of the duty ratio.

<1-3: PWM Control Method in the Present Embodiment>

The auxiliary power source unit 6, using the DC-DC converter 17 which can perform both step-up operation and step-down operation as described above, performs peak cut control for charging the electric double-layer capacitor 18 when the DC bus bar voltage $V_1$ rises, and peak assist control for discharging the electric double-layer capacitor 18 when DC bus bar voltage $V_1$ lowers. However, these peak cut control and peak assist control are difficult in terms of adjustment of switching timing and a changing process of charging and discharging amount in each control and require a complicated sequence, thus becoming troublesome in its control.

For example, as shown in FIG. 3, in the case that a capacitor 41 for charging and discharging is directly connected between the DC bus bars, switching control for charging and discharging as described above is not necessary at all, which is preferable from the viewpoint of simplicity in control. However, in order to prevent overcharge and over discharge, it is preferable to control charging and discharging with the DC-DC converter 17 in the case that the electric double-layer capacitor 18 is used as a capacitor for charging and discharging, although the electric double-layer capacitor can be advantageously charged and discharged with a large current in a short time due to its lower internal resistance as described above. Moreover, because the electric double-layer capacitor 18 has characteristic of lower withstand voltage in one individual, when the electric double-layer capacitor 18 is directly connected between the DC bus bars of large feeding voltage, preferably the plurality of electric double-layer capacitors 18 is connected serially. Moreover, it is preferable to separately dispose a rush-preventing circuit (not shown) for preventing the sudden inflow of large current. As a result, manufacturing costs are increased.

Accordingly, in the present embodiment, a software-like method of adjusting duty ratio for the PWM control of the control unit 19 controls charging and discharging with the DC-DC converter 17 to behave as if the capacitor (electric double-layer capacitor 18) for charging and discharging is directly connected between the DC bus bars 13.

Specifically, the entire auxiliary power source unit 6 in the present embodiment as shown in the left side of FIG. 4 is considered equivalent to a series circuit of a resistor and a capacitor, as shown in the right side of FIG. 4. That is, the entire DC-DC converter 17 is considered equivalent to an equivalent resistor Req1 serially connected to the electric double-layer capacitor 18. Further, in the auxiliary power source unit 6 of the present embodiment, if the DC bus bar voltage $V_1$ and the voltage $V_2$ between both terminals of the electric double-layer capacitor 18 always have a positive correlation, specifically, a proportional relation, the equivalence to the equivalent circuit can be maintained.

Here, on an assumption that the DC bus bar voltage $V_1$ (an embodiment of first DC voltage) is always higher than the voltage $V_2$ between both terminals (an embodiment of second DC voltage), a proportional relation expression between $V_1$ and $V_2$ is as follows:

$$V_2 = \alpha \cdot V_1 \ (0 < \alpha < 1)$$

$$V_1 = 1/\alpha \cdot V_2$$

wherein a proportional coefficient $\alpha$ (an embodiment of first coefficient) is a fixed value that is optionally set. The control unit 19 always adjusts the duty ratio to maintain a direct proportional relation between the DC bus bar voltage $V_1$ and the voltage $V_2$ between both terminals, and performs PWM control for the DC-DC converter 17.

The control unit 19, in the case that DC bus bar voltage $V_1$ rises, controls the charging of the electric double-layer capacitor 18 to maintain the proportional relation, and as a result, performs peak cut control on the DC bus bar 13. Moreover, the control unit 19, in the case that the DC bus bar voltage $V_1$ lowers, controls the discharging of the electric double-layer capacitor 18 to maintain the proportional relation, and as a result, performs peak assist control on the DC bus bar. That is, similarly to the configuration as if the electric double-layer capacitor 18 is directly connected between the DC bus bars 13 (see FIG. 3 above), the DC-DC converter 17 can perform charging and discharging control. As a result, only by performing simple control of maintaining the proportional relation between the two voltage detection values $V_1$ and $V_2$, without being conscious of the timing to switch between the charging control (peak cut control) and discharging control (peak assist control), it is possible to realize the charging and discharging control of the electric double-layer capacitor 18 with good responsiveness automatically responding to the increase or decrease of the DC bus bar voltage $V_1$. Moreover, by properly adjusting the proportional coefficient $\alpha$, it is possible to apply the electric double-layer capacitor 18 having any withstand voltage sufficiently lower than the DC bus bar voltage $V_1$.

<1-4: Effect of First Embodiment>

As described above, in the motor control apparatus 1 of the first embodiment, the control unit 19 controls the DC-DC converter 17 which performs conversion between the DC bus bar voltage $V_1$ of the DC bus bar 13 and the voltage $V_2$ between both terminals of the electric double-layer capacitor 18 that is a capacitor so as to maintain positive correlation between the voltage $V_2$ between both terminals and the DC bus bar voltage $V_1$. In order to maintain the positive correlation, for example, the control to maintain the proportional relation ($V_2 = \alpha \cdot V_1$) is only needed to be performed without requiring a complicated switching sequence to intentionally switch between the peak cut control and peak assist control. Moreover, the charging and discharging control of the electric double-layer capacitor 18 can be realized with good responsiveness automatically responding to the increase and decrease of the DC bus bar voltage $V_1$. Moreover, by properly setting the coefficient $\alpha$ ($0 < \alpha < 1$) in the proportional relation and so on, it also becomes easy to apply the electric double-layer capacitor 18 of low withstand voltage to the power source circuit having a high DC bus bar voltage $V_1$. As a result, an auxiliary power feeding function of DC power can be improved with a simplified control configuration.

Moreover, particularly in the present embodiment, the control unit 19 controls the DC-DC converter 17 to maintain the direct proportional relation ($V_2 = \alpha \cdot V_1$) such that the voltage $V_2$ between both terminals of the electric double-layer capacitor 18 that is a capacitor is a multiplication value of the predetermined proportional coefficient $\alpha$ and the DC bus bar voltage $V_1$. As a result, even under simplified control similar to the case as if the electric double-layer capacitor 18 is directly connected between the DC bus bars 13, it is possible to perform functional charging and discharging control while preventing overcharge and over discharge. Note that the control method of the present embodiment as described above can obtain the same effect even in the case that other capacitors of low internal resistance such as an electrolytic capacitor are employed in place of the electric double-layer capacitor 18.

Moreover, particularly in the present embodiment, the DC-DC converter 17 is a two-way flow type chopper circuit including a semiconductor switching element 21, a diode 22 and an inductance element 23, and the control unit 19 performs PWM control on the semiconductor switching element 21. As a result, DC voltage conversion can be done to suppress the power loss due to the PWM control.

Moreover, particularly in the present embodiment, the control unit 19 includes the DC bus bar voltage detector 31 to detect the DC bus bar voltage $V_1$ from the DC bus bar 13 and the capacitor current detector 32 to detect the capacitor current $I_2$ flowing through the electric double-layer capacitor 18, and performs PWM control in accordance with the duty ratio calculated based on the DC bus bar voltage $V_1$ and the capacitor current $I_2$. As a result, charging and discharging control according to a state of the electric double-layer capacitor 18 can be realized.

2: Second Embodiment

Hereinbelow, a description will be given of a second embodiment with reference to the drawings.

<2-1: PWM Control Method in the Present Embodiment>

In the first embodiment, the PWM control has been performed to maintain the proportional relation between the DC bus bar voltage $V_1$ and the voltage $V_2$ between both terminals of the electric double-layer capacitor 18. However, the electric double-layer capacitor 18 has higher internal resistance compared to, for example, other typical capacitors such as an electrolytic capacitor, and the internal resistance affects the equivalent resistance value in the equivalent circuit. Accordingly, in the present embodiment, PWM control method will be applied which compensates for the internal resistance of the electric double-layer capacitor 18 to enable charging and discharging control with higher accuracy. Note that the circuit configuration of the auxiliary power source unit 6 itself is similar to that of the first embodiment.

As shown in FIG. 5 corresponding to above FIG. 4, the entire auxiliary power source unit 6 shown in the left side is considered equivalent to a series circuit of an equivalent resistor Req1 corresponding to the entire DC-DC converter 17, an equivalent resistor Req2 corresponding to the internal resistance of the electric double-layer capacitor 18, and a substantial capacitor element Ceq of the electric double-layer capacitor 18 as shown in the right side. Further, if in the auxiliary power source unit 6, the DC bus bar voltage $V_1$ and an internal voltage V added to the capacitor element Ceq in the electric double-layer capacitor 18 have proportional relation, the equivalence to the equivalent circuit is maintained.

Here, on an assumption that the DC bus bar voltage $V_1$ (an embodiment of first DC voltage) is always higher than the internal voltage V (an embodiment of second DC voltage), the proportional relation expression between V and $V_1$ is as follows:

$$V = \beta \cdot V_1 \quad (0 < \beta < 1)$$

$$V_1 = 1/\beta \cdot V$$

wherein a proportional coefficient β (an embodiment of second coefficient) is a fixed value that is optionally set. The control unit 19 always adjusts the duty ratio so as to maintain the direct proportional relation between the DC bus bar voltage $V_1$ and the internal voltage V, and performs PWM control for the DC-DC converter 17. As a result, charging and discharging control can be carried out with higher accuracy than in the first embodiment.

<2-2: An Exemplary Feedback Control Block>

The exemplary feedback control block to realize PWM control according to the present embodiment is shown in FIG. 6. The control block shown in the diagram is expressed in the form of transfer function, and the control unit 19 of the auxiliary power source unit 6 is implemented by means of software. In this FIG. 6, the control unit 19 includes an internal voltage command generator 51, an inter-terminal voltage command generator 52, a capacitor current command generator 53, a duty ratio command generator 54, and a PWM control unit 55.

The internal voltage command generator 51 generates an internal voltage command V* by multiplying the DC bus bar voltage $V_1$ detected by the DC bus bar voltage detector 31 by an optionally set function coefficient (=β). The inter-terminal voltage command generator 52 (an embodiment of second DC voltage command generator) calculates a voltage $V_3$ to be added to the internal resistance value by multiplying the capacitor current $I_2$ detected by the capacitor current detector 32 by an internal resistance value r of the electric double-layer capacitor 18 (resistance value of the equivalent resistor Req2; a known value on the component specification), and then adds the internal voltage command V* to the voltage $V_3$ to generate a voltage command $V_2$* between both terminals (an embodiment of second DC voltage command). The capacitor current command generator 53 performs so-called PI control on the deviation between the voltage command $V_2$* between both terminals and the voltage $V_2$ between both terminals detected by the inter-terminal voltage detector 33 to generate a capacitor current command $I_2$*. The duty ratio command generator 54 performs so-called PI control on the deviation between the capacitor current command $I_2$* and the capacitor current $I_2$ detected by the capacitor current detector to generate a duty ratio command. Further, the PWM control unit 55 performs PWM control (Tr1:Tr2=ON:OFF or OFF:ON) on the respective arm switching elements $Q_H$ and $Q_L$ of the DC-DC converter 17 based on the duty ratio command.

With the above feedback control block, the control unit 19 generates, using a function coefficient corresponding to the proportional coefficient β, an inter-terminal voltage command $V_2$* to be added between both terminals of the electric double-layer capacitor 18 based on the relational expression:

$$V_2^* = V^* + V_3$$
$$= \beta \cdot V_1 + r \cdot I_2$$

and then generates the duty ratio command by the feedback of actual detection values of the voltage $V_2$ between both terminals and the capacitor current $I_2$. The control unit 19 calculates the duty ratio to maintain proportional relation of the internal voltage V with the DC bus bar voltage $V_1$ through the feedback control of the detection value of the capacitor current $I_2$.

<2-3: Test Result>

FIG. 7 shows a result of charging and discharging test using the feedback control block. The left side in FIG. 7 shows, as a comparative example, time waveforms of the DC bus bar voltage $V_1$, motor speed, and voltage $V_2$ between both terminals in the case of a configuration in which the electric double-layer capacitor 18 is directly connected to the DC bus bar without use of the DC-DC converter 17. Moreover, the right side in FIG. 7 shows time waveforms of the DC bus bar voltage $V_1$, capacitor current $I_2$, motor speed, and voltage $V_2$ between both terminals in the present embodiment in which the DC-DC converter 17 is used and PWM control is applied with the feedback control block. Note that the proportional coefficient β is set at 0.5.

With comparison of both results, it is confirmed that although the DC bus bar voltage $V_1$ in the present embodiment of the right side fluctuates largely, even if the present embodiment is applied, a low voltage alarm and an over voltage alarm are not generated and the motor can be normally accelerated and decelerated.

<2-4: Effect of Second Embodiment>

As described above, the control unit 19 of the motor control apparatus 1 in the second embodiment controls the DC-DC converter 17 to maintain the direct proportional relation ($V = \beta \cdot V_1$) that the internal voltage V is a multiplication value of the predetermined proportional coefficient β and the DC bus bar voltage $V_1$. As a result, even under simplified and highly accurate control which compensates for the internal resistance Req2 of the electric double-layer capacitor 18 and is similar to the case as if the other general capacitor of low internal resistance (e.g., electrolytic capacitor) is directly connected between the DC bus bars 13, it is possible to perform functional charging and discharging control while preventing overcharge and over discharge.

Moreover, particularly in the present embodiment, the control unit 19 calculates a duty ratio to maintain proportional relation of the internal voltage V to the DC bus bar voltage $V_1$ through feedback control of the capacitor current $I_2$. As a result, it is possible to perform control to maintain the proportional relation of the internal voltage V with high responsiveness in response to fluctuations of the DC bus bar voltage $V_1$.

Moreover, particularly in the present embodiment, the control unit 19 performs PWM control with the feedback control block shown in above FIG. 6 to realize PWM control to maintain the direct proportional relation ($V=\beta \cdot V_1$) between the DC bus bar voltage $V_1$ and the internal voltage V of the electric double-layer capacitor 18 using the optionally set function coefficient $\beta$ while compensating for the internal resistance of the electric double-layer capacitor 18.

3: Modification

Note that the disclosed embodiment is not limited to the above, and various modifications can be made without departing from the spirit and technical ideas thereof. For example, the power conversion device may be configured only with the AC-DC converter 4 and the auxiliary power source unit 6 in above FIG. 1. In this case, preferably, the power conversion device is used as a stabilized power source for other electrical equipment (e.g., personal computer, etc.) other than the motor control apparatus. Moreover, only the auxiliary power source unit 6 may be configured as an independent device. In this case, the auxiliary power source unit 6 is preferably used for a typical DC power source connecting a large number of electrical equipment, for instance, when optionally connected to a DC bus bar according to the number of electrical equipment.

It is noted that if terms "vertical," "parallel," "plane," etc. are used in the above description, these terms are not used in the exact meanings thereof. Specifically, these terms "vertical," "parallel," and "plane" allow tolerances and errors in design and manufacturing and have meanings of "approximately vertical," "approximately parallel," and "approximately plane."

It is noted that if terms "same," "equal," "different," etc. in relation to a dimension, a size, a shape and a position of the appearance are used in the above description, these terms are not used in the exact meaning thereof. Specifically, these terms "same," "equal," and "different" allow tolerances and errors in design and manufacturing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A motor control apparatus comprising:
an AC-DC converter to convert AC power into DC power and to feed the DC power to a DC bus bar;
an auxiliary power source, DC power being fed from the auxiliary power source to the DC bus bar and from the DC bus bar to the auxiliary power source, the auxiliary power source comprising:
a capacitor;
a DC-DC converter to perform conversion between a first DC voltage of the DC bus bar and a second DC voltage applied between both terminals of the capacitor; and
circuitry configured to control the DC-DC converter to maintain directly proportional relation that the second DC voltage is a value obtained by multiplying the first DC voltage by a predetermined first coefficient; and
an inverter to convert the DC power of the DC bus bar into AC power and to feed the AC power to a motor.

2. The motor control apparatus according to claim 1, wherein the DC-DC converter includes a chopper circuit comprising a semiconductor switching element, a diode, and an inductor, and
wherein the circuitry is configured to perform PWM control on the semiconductor switching element.

3. The motor control apparatus according to claim 2, wherein the circuitry comprises:
a first voltage detector to detect the first DC voltage of the DC bus bar; and
a current detector to detect a capacitor current flowing through the capacitor, and
wherein the circuitry is configured to perform the PWM control in accordance with a duty ratio calculated based on the first DC voltage and the capacitor current.

4. A motor control apparatus comprising:
an AC-DC converter to convert AC power into DC power and to feed the DC power to a DC bus bar;
an auxiliary power source, DC power being fed from the auxiliary power source to the DC bus bar and from the DC bus bar to the auxiliary power source, the auxiliary power source comprising:
an electric double-layer capacitor;
a DC-DC converter to perform conversion between a first DC voltage of the DC bus bar and a second DC voltage applied inside of the electric double-layer capacitor; and
circuitry configured to control the DC-DC converter to maintain directly proportional relation that the second DC voltage is a value obtained by multiplying the first DC voltage by a predetermined second coefficient; and
an inverter to convert the DC power of the DC bus bar into AC power and to feed the AC power to a motor.

5. The motor control apparatus according to claim 4, wherein the DC-DC converter includes a chopper circuit comprising a semiconductor switching element, a diode, and an inductor, and
wherein the circuitry is configured to perform PWM control on the semiconductor switching element.

6. The motor control apparatus according to claim 5, wherein the circuitry comprises:
a first voltage detector to detect the first DC voltage of the DC bus bar; and
a current detector to detect a capacitor current flowing through the capacitor, and wherein the circuitry is configured to perform the PWM control in accordance with a duty ratio calculated based on the first DC voltage and the capacitor current.

7. The motor control apparatus according to claim 6, wherein the circuitry is configured to calculate the duty ratio to maintain proportional relation of the second DC voltage to the first DC voltage through feedback control of the capacitor current.

8. The motor control apparatus according to claim 7, wherein the circuitry comprises:
an inter-terminal voltage detector to detect a voltage between both terminals of the electric double-layer capacitor;
an internal voltage command generator to generate an internal voltage command by multiplying the first DC voltage detected by the first voltage detector by a function coefficient corresponding to a predetermined set value;
a second DC voltage command generator to generate a second DC voltage command by adding, to the internal voltage command, a multiplication value of the capacitor current detected by the current detector and an internal resistance value of the electric double-layer capacitor;
a capacitor current command generator to generate a capacitor current command based on a deviation between the second DC voltage command and the voltage between the both terminals detected by the inter-terminal voltage detector;
a duty ratio command generator to generate a duty ratio command based on a deviation between the capacitor current command and the capacitor current detected by the current detector; and
a PWM controller configured to perform the PWM control based on the duty ratio command.

9. A power conversion device comprising:
an AC-DC converter to convert AC power into DC power and to feed the DC power to a DC bus bar; and
an auxiliary power source, DC power being fed from the auxiliary power source to the DC bus bar and from the DC bus bar to the auxiliary power source, the auxiliary power source comprising:
a capacitor;
a DC-DC converter to perform conversion between a first DC voltage of the DC bus bar and a second DC voltage applied between both terminals of the capacitor; and
circuitry configured to control the DC-DC converter to maintain directly proportional relation that the second DC voltage is a value obtained by multiplying the first DC voltage by a predetermined first coefficient.

10. An auxiliary power source device, DC power being fed from the auxiliary power source device to a DC bus bar and from the DC bus bar to the auxiliary power source device, the auxiliary power source device comprising:
a capacitor;
a DC-DC converter to perform conversion between a first DC voltage of the DC bus bar and a second DC voltage applied between both terminals of the capacitor; and
circuitry configured to control the DC-DC converter to maintain directly proportional relation that the second DC voltage is a value obtained by multiplying the first DC voltage by a predetermined first coefficient.

11. A method for controlling an auxiliary power source device including a capacitor and a DC-DC converter, the method comprising:
performing conversion in the DC-DC converter between a first DC voltage of a DC bus bar and a second DC voltage applied between both terminals of the capacitor; and
controlling the DC-DC converter to maintain directly proportional relation that the second DC voltage is a value obtained by multiplying the first DC voltage by a predetermined first coefficient.

12. A power conversion device comprising:
an AC-DC converter to convert AC power into DC power and to feed the DC power to a DC bus bar; and
an auxiliary power source, DC power being fed from the auxiliary power source to the DC bus bar and from the DC bus bar to the auxiliary power source, the auxiliary power source comprising:
an electric double-layer capacitor;
a DC-DC converter to perform conversion between a first DC voltage of the DC bus bar and a second DC voltage applied inside of the electric double-layer capacitor; and
circuitry configured to control the DC-DC converter to maintain directly proportional relation that the second DC voltage is a value obtained by multiplying the first DC voltage by a predetermined second coefficient.

13. An auxiliary power source device, DC power being fed from the auxiliary power source device to a DC bus bar and from the DC bus bar to the auxiliary power source device, the auxiliary power source device comprising:
an electric double-layer capacitor;
a DC-DC converter to perform conversion between a first DC voltage of the DC bus bar and a second DC voltage applied inside of the electric double-layer capacitor; and
circuitry configured to control the DC-DC converter to maintain directly proportional relation that the second DC voltage is a value obtained by multiplying the first DC voltage by a predetermined second coefficient.

14. A method for controlling an auxiliary power source device including an electric double-layer capacitor and a DC-DC converter, the method comprising:
performing conversion in the DC-DC converter between a first DC voltage of a DC bus bar and a second DC voltage applied inside of the electric double-layer capacitor; and
controlling the DC-DC converter to maintain directly proportional relation that the second DC voltage is a value obtained by multiplying the first DC voltage by a predetermined second coefficient.

* * * * *